United States Patent
Willford et al.

(10) Patent No.: US 11,148,529 B1
(45) Date of Patent: Oct. 19, 2021

(54) SYSTEM AND METHOD FOR CONTROLLING TRACTION OF TANDEM AXLES

(71) Applicant: Dana Heavy Vehicle Systems Group, LLC, Maumee, OH (US)

(72) Inventors: George A. Willford, Waterville, OH (US); Patrick F. Rose, Hilliard, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/174,205

(22) Filed: Feb. 11, 2021

(51) Int. Cl.
*B60K 23/08* (2006.01)
*B60K 17/36* (2006.01)
*B60K 23/04* (2006.01)

(52) U.S. Cl.
CPC .......... *B60K 17/36* (2013.01); *B60K 23/0808* (2013.01); *B60K 23/04* (2013.01); *B60K 2023/046* (2013.01)

(58) Field of Classification Search
CPC .... B60K 17/36; B60K 23/0808; B60K 23/04; B60K 2023/046
See application file for complete search history.

(56) References Cited

U.S. PATENT DOCUMENTS

| | | | |
|---|---|---|---|
| 6,085,138 A | 7/2000 | Smith et al. | |
| 7,152,720 B2 | 12/2006 | Claussen et al. | |
| 7,729,839 B2 | 6/2010 | Claussen et al. | |
| 7,770,681 B2 | 8/2010 | Marathe et al. | |
| 8,109,853 B2 | 2/2012 | Povirk et al. | |
| 8,312,956 B2 | 11/2012 | Rindfleisch | |
| 9,605,740 B2 | 3/2017 | Povirk et al. | |
| 2003/0021612 A1 | 1/2003 | Morikawa et al. | |
| 2013/0017927 A1* | 1/2013 | Morscheck | B60K 17/16 477/35 |
| 2014/0129100 A1* | 5/2014 | Nellums | B60W 10/04 701/58 |
| 2016/0272177 A1 | 9/2016 | Korson et al. | |

FOREIGN PATENT DOCUMENTS

| | | | | |
|---|---|---|---|---|
| EP | 1884396 A1 | 2/2008 | | |
| EP | 1908621 A1 * | 4/2008 | ............. | B60K 17/36 |

* cited by examiner

*Primary Examiner* — Justin Holmes
(74) *Attorney, Agent, or Firm* — McCoy Russell LLP

(57) ABSTRACT

Methods and systems for improving traction and control of a tandem axle are described. In one example, a controller automatically locks an inter-axle differential so that traction of a vehicle may be improved. The approach may also include automatically locking one or more axle differentials in conjunction with locking of the inter-axle differential.

20 Claims, 6 Drawing Sheets

SYSTEM AND METHOD FOR CONTROLLING TRACTION OF TANDEM AXLES

TECHNICAL FIELD

The present disclosure relates to a system and method for improving traction of a system of tandem axles. The system and method automatically control locking and unlocking of an inter-axle differential.

BACKGROUND AND SUMMARY

A vehicle may include tandem axles to improve traction. The tandem axles may increase the contact area between driven wheels and the ground so that a greater amount of torque may be transferred from a driveline without causing wheel slip. However, coupling a rear axle to a front axle of a tandem axle vehicle may increase driveline losses and reduce vehicle fuel efficiency. Therefore, it may be desirable to selectively couple a rear axle of a tandem axle vehicle to a front axle of the tandem axle vehicle. One way to cause a rear axle to be coupled to a front axle is via receiving a manual input command from a human driver of a vehicle. For example, the human driver may apply a pushbutton and the pushbutton enables electrical current to flow to a solenoid or other electro-mechanical device that locks an inter-axle differential such that torque from an engine or electric machine is transferred to both of a front axle and a rear axle of a tandem axle vehicle. While such a system may be effective, its operation may be less than optimal if the driver does not follow training or recommended guidelines.

The inventors herein have recognized the above-mentioned issues and have developed a method for operating a tandem axle, comprising: via a controller, locking an inter-axle differential to distribute torque to a first axle and a second axle in response to a brake pedal not being applied, an indication of slip of a wheel, and a rotational speed differential between a transmission output rotational speed multiplied by a gear ratio and a wheel rotational speed exceeding a threshold speed.

By operating an inter-axle differential lock according to wheel slip, a rotational speed differential, and a rotational speed differential between a transmission output speed multiplied by a gear ratio and a wheel rotational speed exceeding a threshold speed, it may be possible to provide the technical result of automatically locking an inter-axle differential in a way that limits driveline losses while improving traction. Further, automatic locking and unlocking of the inter-axle differential may reduce a possibility of driveline wear.

The present description may provide several advantages. In particular, the approach may improve control over tandem axles. In addition, the approach may reduce driveline energy consumption while improving vehicle traction. Further, the approach may reduce a possibility of driveline degradation during traction control situations.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
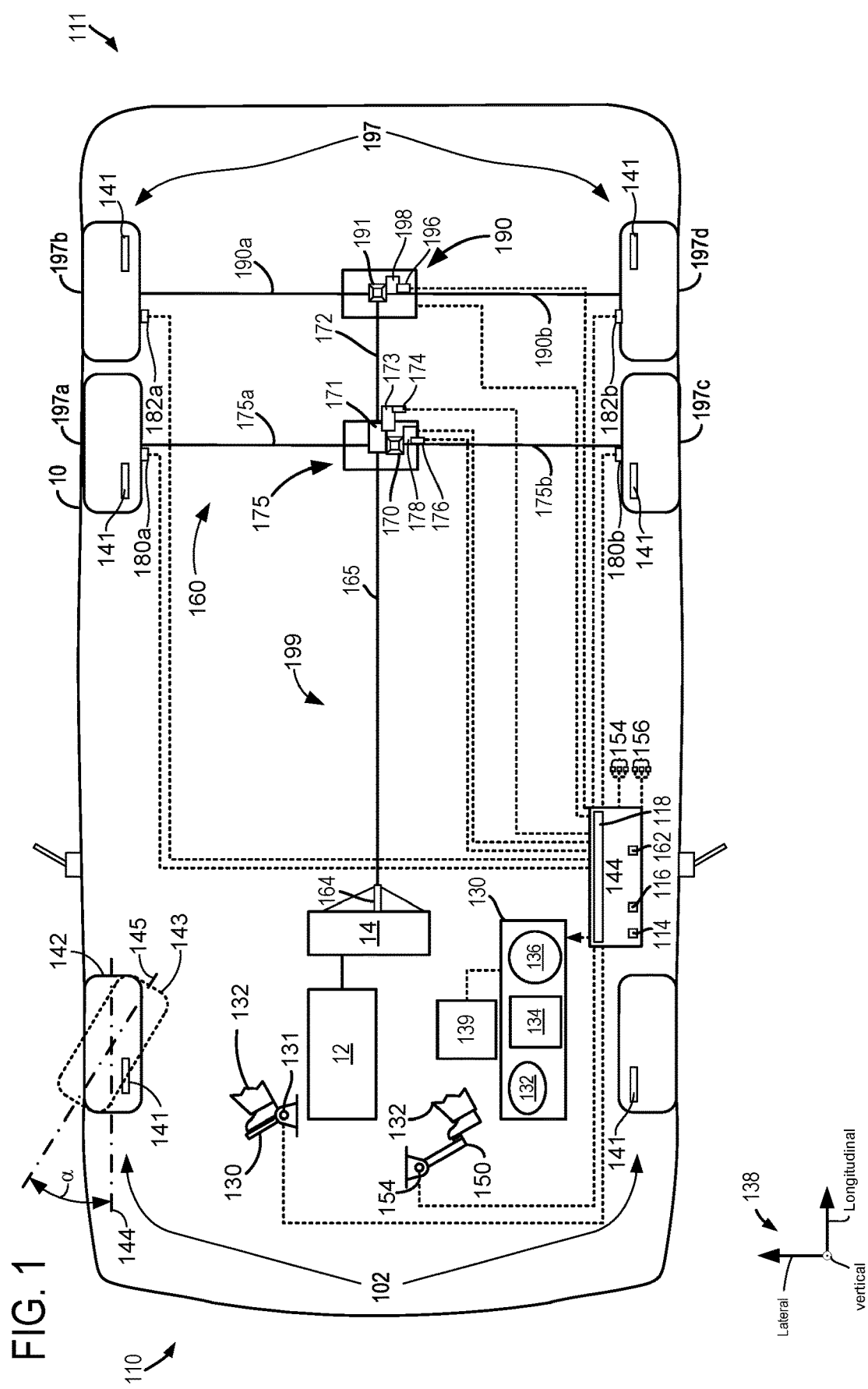
FIG. 1 is a schematic diagram of a driveline assembly including control circuitry.
Figure 2:
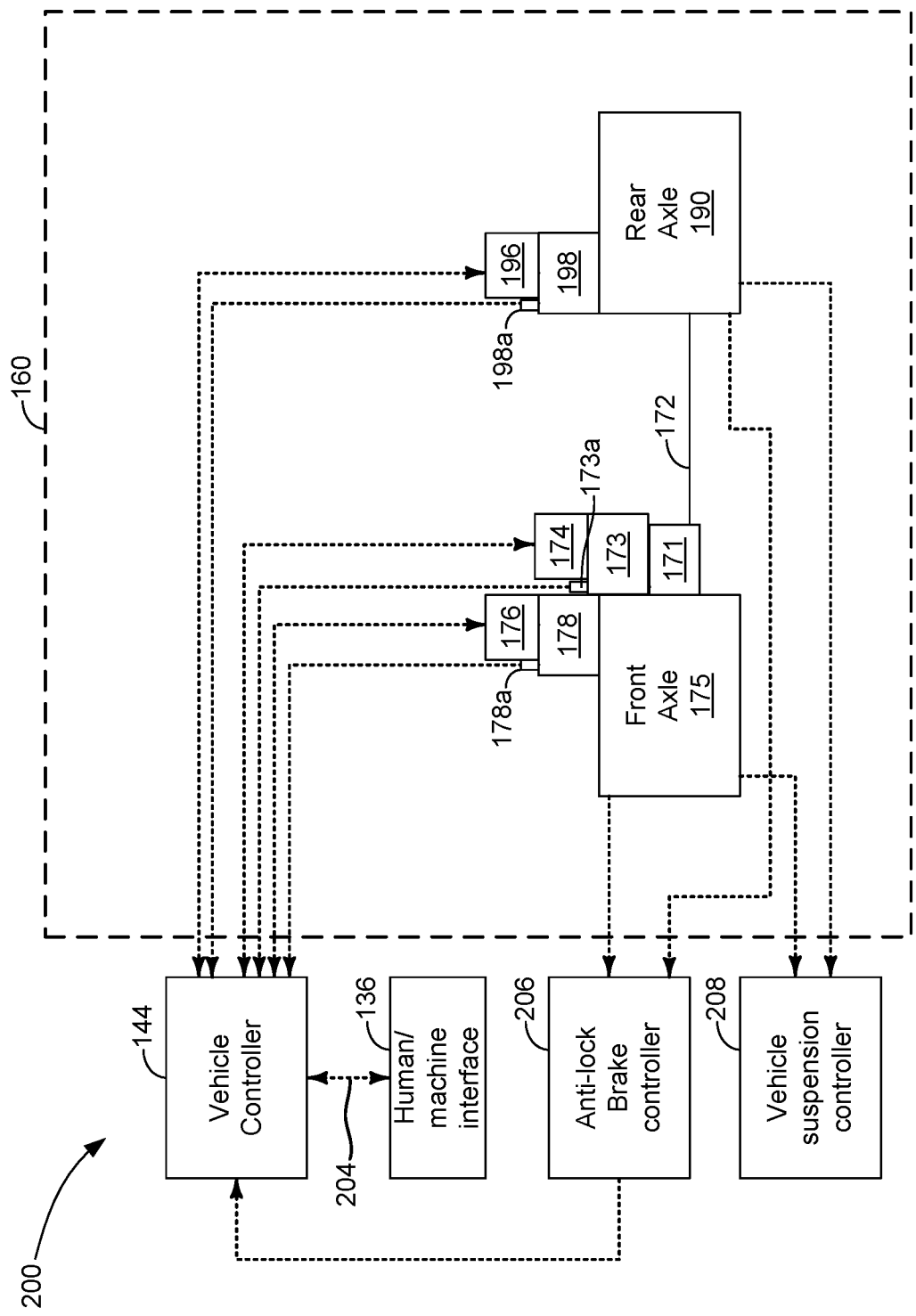
FIGS. 2 and 3 show block diagrams of example tandem axle control systems.
Figure 3:
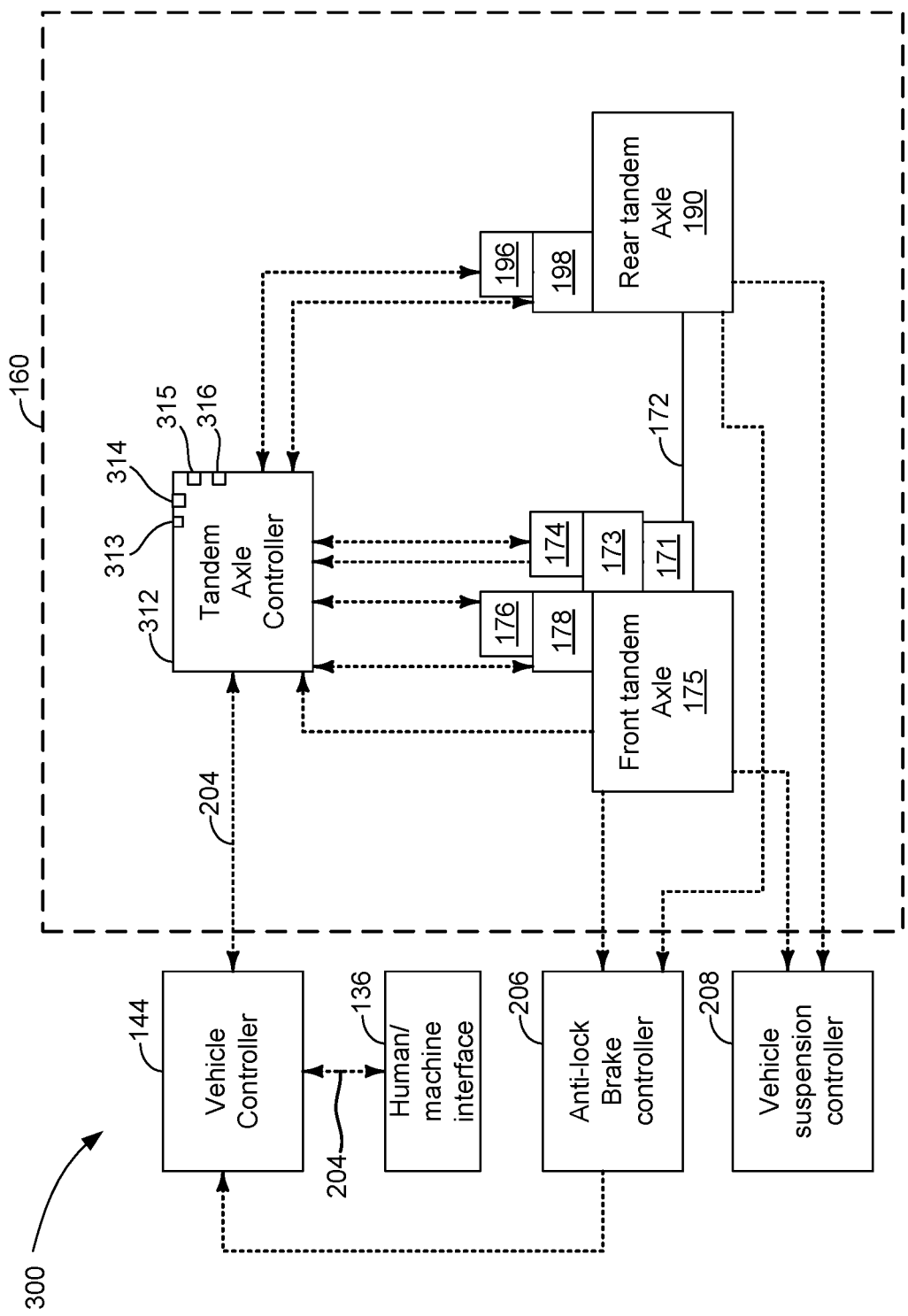
Figure 4:
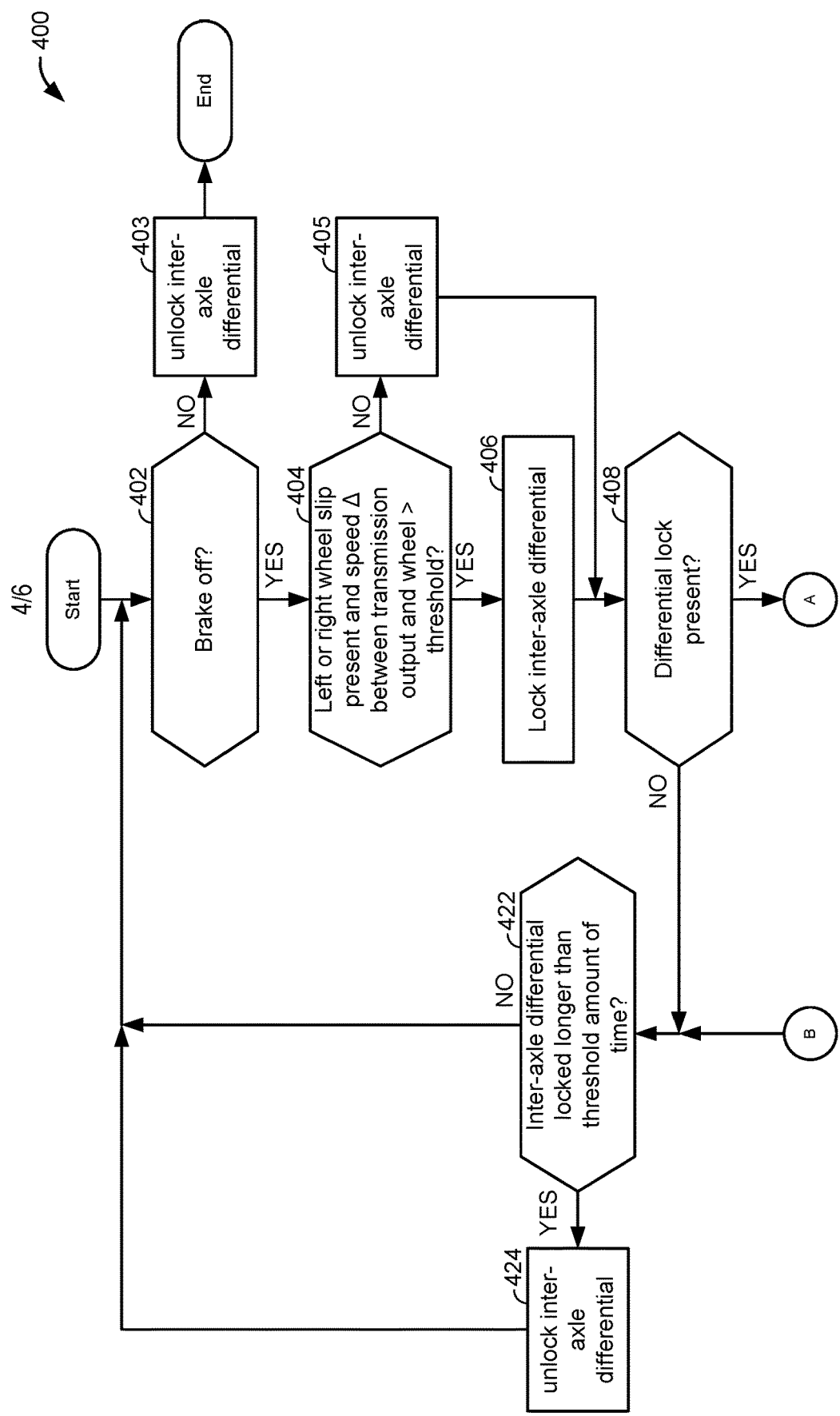
FIGS. 4 and 5 show a flowchart of an example method for controlling a tandem axle.
Figure 5:
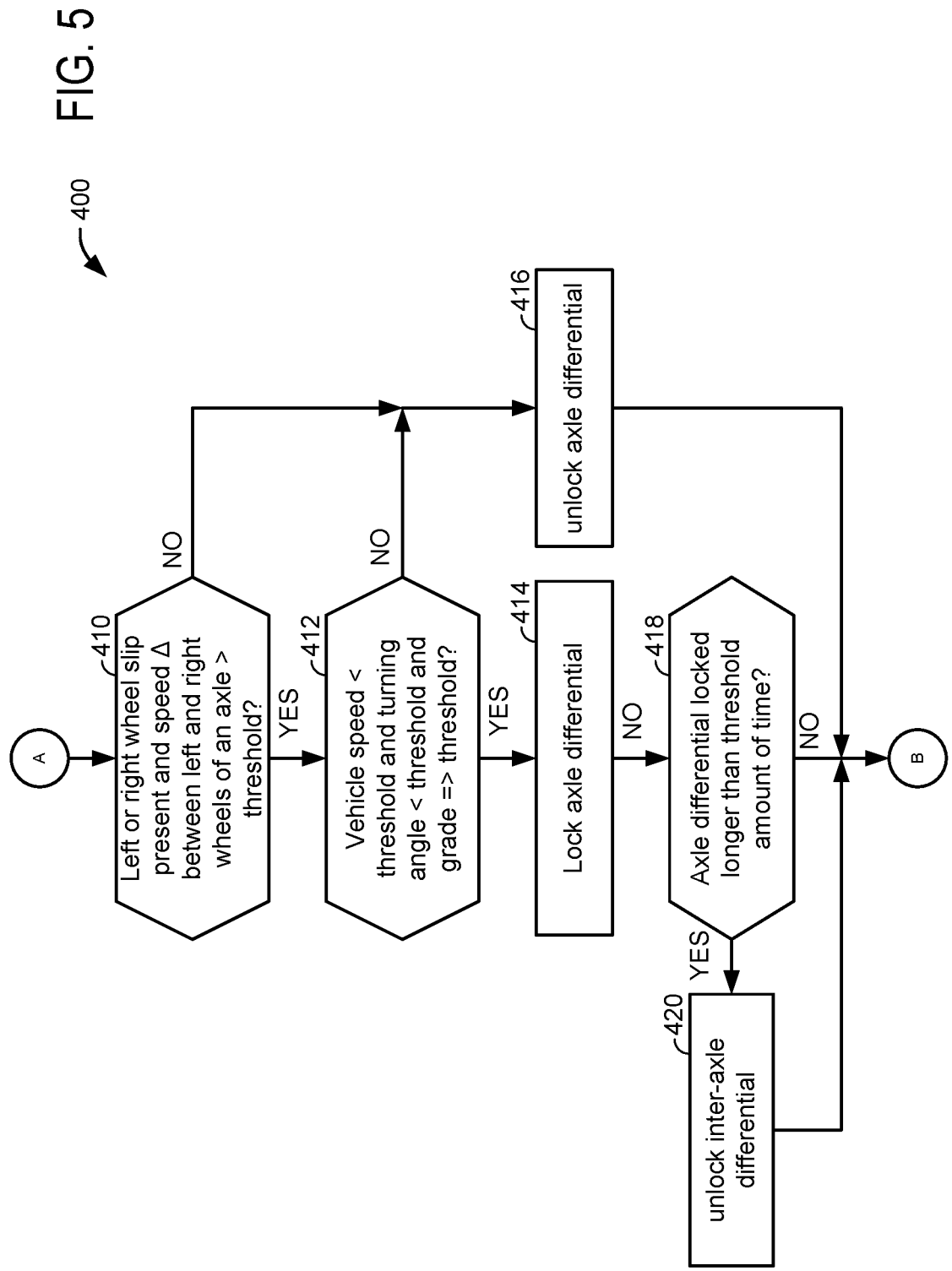
Figure 6:
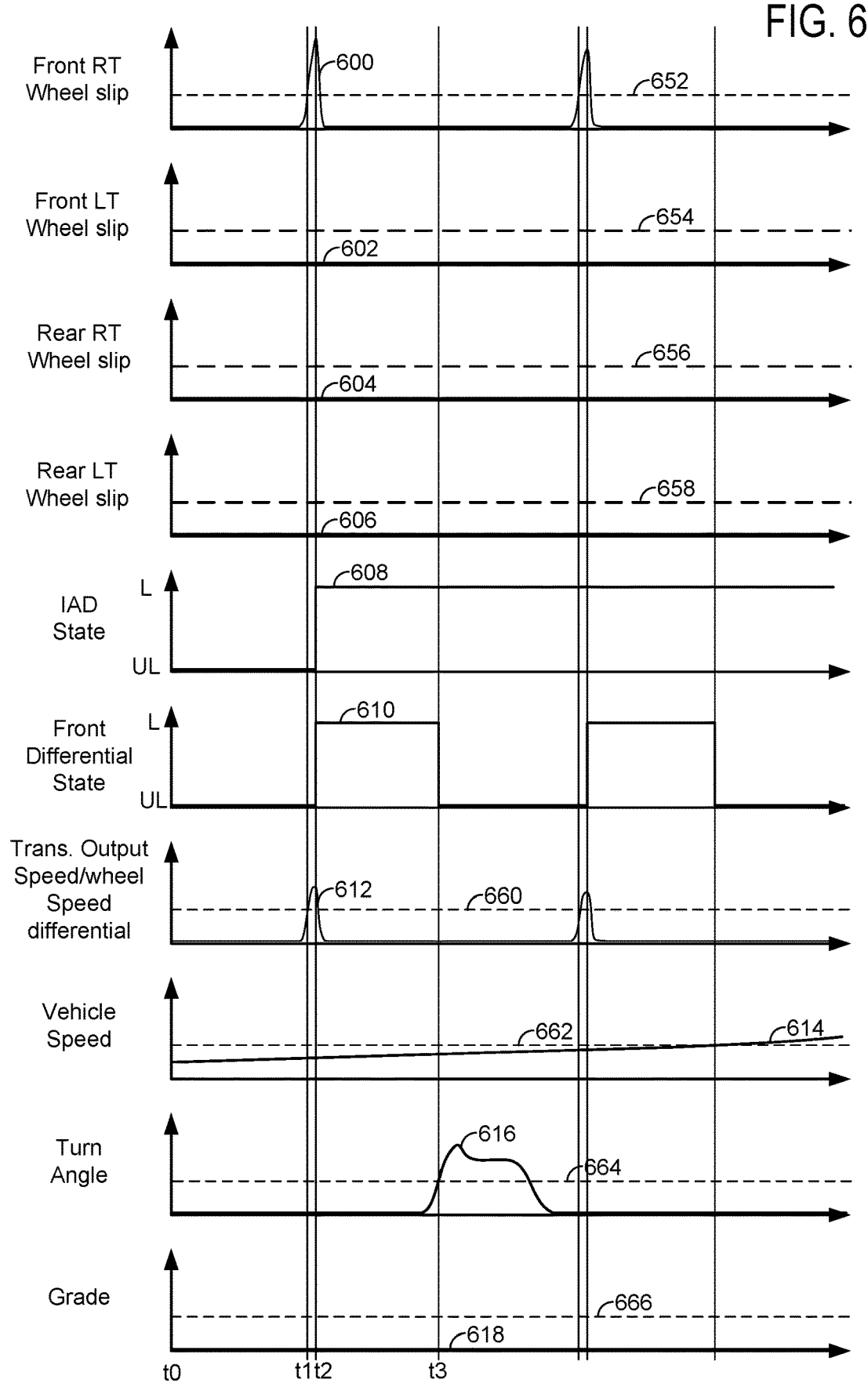
FIG. 6 shows an example operating sequence for a tandem axle.

The following description relates to systems and methods for automatically controlling locking and unlocking of differentials of a tandem axle. The approach described herein may improve vehicle traction by automatically locking one or more differentials. The approach may also reduce driveline losses via automatically unlocking the differentials. Further, the approach may also reduce a possibility of driveline degradation. An example powertrain or driveline is shown in FIG. 1. FIGS. 2 and 3 show block diagrams of example control system embodiments. FIGS. 4 and 5 show a flowchart for an example method to operate a tandem axle. FIG. 6 shows an example operating sequence for a tandem axle according to the method of FIGS. 4 and 5.

FIG. 1 illustrates an example vehicle driveline 199 included in vehicle 10. Mechanical connections are shown in FIG. 1 as solid lines and electrical connections are indicated as dashed lines.

Vehicle 10 includes a front side 110 and a rear side 111. Vehicle 10 includes front wheels 102 and rear wheels 197. In this example, vehicle 10 is configured with a tandem axle 160. Vehicle 10 includes a propulsion source 12 that may selectively provide propulsive effort to tandem axle 160. Propulsion source 12 may be an internal combustion engine (e.g., spark ignited or diesel), or alternatively, propulsion source 12 may be an electric machine (e.g., a motor/generator), or a combination thereof. Propulsion source is shown mechanically coupled to gearbox 14, and gearbox 14 is mechanically coupled to tandem axle 160. Propulsion source 12 may provide mechanical power to gearbox 14. Tandem axle 160 may receive mechanical power from gearbox 14 via transmission or gearbox output shaft 164, which drives driveshaft 165, so that mechanical power may be transmitted to rear wheels 197.

Tandem axle 160 comprises a front axle assembly 175 and a rear axle assembly 190. Front axle assembly 175 may include an inter-axle differential 171 to distribute power from gearbox 14 to front axle assembly 175 and rear axle assembly 190. Inter-axle differential 171 may include a locking mechanism 173, which may be engaged or disengaged via electro-mechanical actuator 174. Locking inter-axle differential 171 causes front axle assembly 175 to be driven at a speed that is equal to a speed that rear axle assembly 190 is being driven. Unlocking inter-axle differential 171 allows front axle assembly 175 to be driven at a speed that is different to a speed that rear axle assembly 190 is driven. Front axle 175 also comprises two half shafts, including a first or right haft shaft 175*a* and a second or left half shaft 175*b*. The front axle 175 may be an integrated axle that includes a front axle differential gear set 170. Front axle differential gear set 170 may be open when vehicle 10 is traveling on roads and negotiating curves so that right front wheel 197a may rotate at a different speed than left front wheel 197c. Front axle differential gear set 170 allows vehicle 10 to turn without dragging right front wheel 197a or left front wheel 197c. Front axle 175 also includes a differential locking mechanism 178 and an electro-mechanical differential locking actuator 176. However, in some examples, front axle 175 may not include a differential locking mechanism and electro-mechanical differential locking actuator 176. Differential locking mechanism 178 may be engaged to lock front axle differential 170 during conditions when wheel slip is present so that right front wheel 197a may rotate at a same speed as left front wheel 197c. Driveshaft 172 mechanically couples inter-axle differential 171 to rear axle assembly 190.

Rear axle 190 comprises two half shafts, including a first or right haft shaft 190a and a second or left half shaft 190b. The rear axle 190 may be an integrated axle that includes a differential gear set 191. Differential gear set 191 may be open when vehicle 10 is traveling on roads and negotiating curves so that right rear wheel 197b may rotate at a different speed than left rear wheel 197d. Rear axle 190 also includes a differential locking mechanism 198 and an electro-mechanical differential locking actuator 196. However, in some examples, rear axle 190 may not include a differential locking mechanism and electro-mechanical differential locking actuator 196. Differential locking mechanism 198 may be engaged to lock rear axle differential 191 during conditions when wheel slip is present so that right rear wheel 197b may rotate at a same speed as left rear wheel 197d.

In this example, vehicle 10 includes a vehicle controller 144. Controller 144 may communicate with dash board 130, propulsion source 12, gearbox 14, and tandem axle 160. Further, controller 144 may communicate with other controllers (not shown) where present. Controller 144 includes read-only memory (ROM or non-transitory memory) 114, random access memory (RAM) 116, a digital processor or central processing unit (CPU) 162, and inputs and outputs (I/O) 118 (e.g., digital inputs including counters, timers, and discrete inputs, digital outputs, analog inputs, and analog outputs). Controller 144 may receive signals from sensors 154 and provide control signal outputs to actuators 156. Sensors 154 may include but are not limited to inter-axle differential locking mechanism position sensor, front axle differential locking mechanism position sensor, and rear axle differential locking mechanism position sensor, road grade sensor (e.g., inclinometer). Actuators 156 may include but are not limited to propulsion source torque actuators (e.g., throttles, inverters, fuel injectors, etc.). Driver demand torque may be input to controller 144 via propulsive effort pedal 130. A position of propulsive effort pedal 130 may be provided by propulsive effort pedal sensor 131. Human driver 132 may apply and release propulsive effort pedal to communicate a driver demand torque or power to controller 144. Driver demand torque may be input to controller 144 via propulsive effort pedal 130. A position of brake pedal 150 may be provided by brake pedal sensor 154. Human driver 132 may apply and release brake pedal to communicate a driver braking torque or power request to controller 144. Foundation friction brakes 141 may be applied and released according to the requested driver braking torque or power. Wheel position/speed sensors 180a, 182a, 180b, and 182b may provide wheel speed data to controller 144 for determining the presence or absence of wheel slip.

Vehicle 10 may also include a dashboard 130 that an operator of the vehicle may interact with. Dashboard 130 may include an interactive weather data display and notification system 134 that may communicate weather forecast data to controller 144. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller 144. As such, in some examples, the vehicle operator may communicate via display system 132 with an internet site or software application (app) and controller 144.

Dashboard 130 may further include an operator interface 136 via which the vehicle operator may adjust the operating status of the vehicle. Specifically, the operator interface 136 may be configured to initiate and/or terminate operation of the vehicle driveline (e.g., propulsion source 12) based on an operator input. Operator interface 136 may also allow a human vehicle operator to manually lock (e.g., engage) and unlock (e.g., disengage) inter-axle differential locking mechanism 173, front axle differential locking mechanism 178, and rear axle differential locking mechanism 198. Various examples of the operator interface 136 may include interfaces that require a physical apparatus, such as an active key, that may be inserted into the operator interface 136 to activate the propulsion source 12 and to turn on the vehicle 10, or may be removed to shut down the propulsion source 12 and to turn off the vehicle. Other examples may include a passive key that is communicatively coupled to the operator interface 136. The passive key may be configured as an electronic key fob or a smart key that does not have to be inserted or removed from the interface 136 to operate the propulsion source 12. Still other examples may additionally or optionally use a start/stop button that is manually pressed by the operator to start or shut down the propulsion source 12. Spatial orientation of vehicle 10 is indicated via axes 138.

Steering of vehicle 10 may be adjusted to change a turning angle α of vehicle 10. In this example, the front right wheel is shown in a straight or zero turning angle via the solid lines as indicated at 142. The front right wheel is also shown at turning angle α via dashed lines as indicated at 143. The angle α may be measured from a centerline of the right wheel at zero turning angle 144 and the centerline of the right wheel at a turning angle 145.

Turning now to FIG. 2, a detailed view of a first tandem axle control system 200 is shown. Tandem axle 160 is comprised of a front axle 175 and a rear axle 190. Tandem axle 160 also includes an inter-axle differential 171 and a driveshaft 172 that mechanically couples rear axle 190 to inter-axle differential 171. Inter-axle differential 171 is also mechanically coupled to front axle 175. Vehicle controller 144, human/machine interface 136, anti-lock brake controller 206, and vehicle suspension controller 208 are external to tandem axle 160.

In this example, control of tandem axle 160 actuators is provided via vehicle controller 144. In particular, vehicle controller 144 may automatically provide signals to engage and disengage inter-axle differential locking mechanism 173, front axle differential locking mechanism 178, and rear axle differential locking mechanism 198. Vehicle controller 144 may also receive positions of inter-axle differential locking mechanism 173, front axle differential locking mechanism 178, and rear axle differential locking mechanism 198 via position sensors 178a, 173a, and 198a to confirm their locking (e.g., engagement) and unlocking (e.g., disengagement). Controller 144 may receive wheel speeds from anti-lock brake controller 206.

Front axle 175 and rear axle 190 may provide left and right wheel speeds to anti-lock brake controller 206. Further, front axle 175 and rear axle 190 may provide left and right wheel speeds to vehicle suspension controller 208.

A human driver may be allowed to manually engage or disengage inter-axle differential locking mechanism 173, front axle differential locking mechanism 178, and rear axle differential locking mechanism 198 during some conditions via human/machine interface 136. Human/machine interface 136 may communicate the human's request to vehicle controller 144 via controller area network (CAN) 204. The human driver may also adjust selected tandem axle control parameters via human/machine interface 136.

Referring now to FIG. 3, a detailed view of a second tandem axle control system 300 is shown. In this example, tandem axle 160 includes all of the components that the tandem axle shown in FIG. 2 includes. In addition, tandem axle 160 includes a tandem axle controller 312. Tandem axle controller includes a central processing unit 313, non-transitory memory 314 (e.g., read only memory), random access memory 315, and inputs and outputs (e.g., digital and analog inputs and outputs) 316.

In this example, control of tandem axle 160 actuators is provided via tandem axle controller 312. Tandem axle controller may communicate with vehicle controller 144 to receive tandem axle requests and data that are input by a human into human/machine interface 304 via controller area network 204. Tandem axle controller 312 may also receive wheel speeds from vehicle controller 144. Tandem axle controller 312 may automatically provide signals to engage and disengage inter-axle differential locking mechanism 173, front axle differential locking mechanism 178, and rear axle differential locking mechanism 198. Tandem axle controller 312 may also receive positions of inter-axle differential locking mechanism 173, front axle differential locking mechanism 178, and rear axle differential locking mechanism 198 via position sensors 178a, 173a, and 198a to confirm their locking (e.g., engagement) and unlocking (e.g., disengagement).

Front axle 175 and rear axle 190 may provide left and right wheel speeds to anti-lock brake controller 206. Further, front axle 175 and rear axle 190 may provide left and right wheel speeds to vehicle suspension controller 208.

As previously described, a human driver may be allowed to manually engage or disengage inter-axle differential locking mechanism 173, front axle differential locking mechanism 178, and rear axle differential locking mechanism 198 during some conditions via human/machine interface 136. Human/machine interface 136 may communicate the human's request to vehicle controller 144 via controller area network (CAN) 204. The human driver may also adjust selected tandem axle control parameters via human/machine interface 136.

In this way, the system of FIG. 3 may be partitioned differently than the system of FIG. 2. The system of FIG. 3 may reduce the computational load on vehicle controller 144. However, the cost of the system in FIG. 3 may be higher due to inclusion of a second controller.

The system of FIGS. 1-2C provides for a system for operating a tandem axle, comprising: a first axle including a first differential; a second axle including a second differential; an inter-axle differential configured to deliver torque to the first axle and the second axle, the inter-axle differential including a differential locking mechanism; and a controller including executable instructions that cause the controller to lock the inter-axle differential to distribute torque to the first axle and the second axle in response to a brake pedal not being applied, an indication of slip of a wheel, and a rotational speed differential between a transmission output rotational speed multiplied by a gear ratio and a wheel rotational speed exceeding a threshold speed. The system further comprises additional instructions to lock the first differential in response to a rotational speed differential between a left wheel of the first axle and a right wheel of the first axle being greater than a first threshold, vehicle speed being less than a second threshold, and a turning angle being less than a third threshold. The system further comprises additional instructions to unlock the first differential in response to the turning angle being greater than the third threshold. The system further comprises additional instructions to unlock the first differential in response to the vehicle speed being greater than the second threshold. The system further comprises additional instructions to unlock the first differential in response to an amount of time the first differential is locked. The system further comprises additional instructions to unlock the inter-axle differential a predetermined amount of time after most recently locking the inter-axle differential. The system further comprises additional instructions to unlock the inter-axle differential in response to the brake being applied.

Referring now to FIGS. 4 and 5, an example method for automatically controlling operation of a tandem axle is shown. At least portions of method FIGS. 4 and 5 may be performed via a controller in cooperation with the system of FIGS. 1-3. In some examples, at least portions of method FIGS. 4 and 5 may be incorporated as executable instructions stored in non-transitory memory of a controller as shown in FIGS. 1-3. In addition, some portions of the method may be performed via the controller transforming operating states of devices and actuators in the physical world. The method of FIGS. 4 and 5 may be performed when a vehicle is operating and traveling on-road or off-road.

At 402, method 400 judges if the vehicle's brake pedal is off or not applied. If so, the answer is yes and method 400 proceeds to 404. Otherwise, the answer is no and method 400 proceeds to 403. Method 400 may judge if the vehicle's brake pedal is applied by way of a brake pedal position sensor. Method 400 may assess the position of the brake pedal and unlock axle and inter-axle differentials responsive to brake pedal position so that anti-lock brakes may be more effective during vehicle braking.

At 403, method 400 unlocks the inter-axle differential and any axle differentials that are presently locked. The inter-axle differential and the axle differentials may be unlocked to improve braking performance and to reduce driveline losses. Method 400 proceeds to exit.

At 404, method 400 judges whether or not left front wheel slip or right front wheel slip is present, and if a rotational speed differential between a transmission output shaft rotational speed multiplied by the axle's gear ratio and a rotational speed of a wheel of the front axle is greater than a threshold speed. This condition may be judged if the inter-axle differential is unlocked. Method 400 may proceed to 406 if the inter-axle differential is already in a locked state. The condition may be expressed as:

If ((slip$FL$ OR slip$FR$) AND ((((Trns_speed*$FDR$)−speed$FL$)>thres1) OR (((Trns_speed*$FDR$)−speed$FR$)>thres1)))

where slipFL is a value that indicates the presence or absence of slip at the left front wheel of the tandem axle, slipFR is a value that indicates the presence or absence of slip at the right front wheel of the tandem axle, AND is a logical "AND" operator, Trns_speed is the output shaft rotational speed of the transmission, FDR is the final drive or axle ratio, speedFL is the rotational speed of the front left wheel of the tandem axle, thresh1 is a first speed threshold, OR is a logical "OR" operator, and speedFR is the rotational speed of the right front wheel of the tandem axle. This conditional statement assesses transmission output shaft rotational speed relative to wheel speeds of the front left and front right wheels of the tandem axle.

Wheel slip is relative motion between a tire of a wheel and a surface that the tire is rolling on and wheel slip may be present when a wheel's speed is greater or less than the wheel's free rolling speed. Thus, the presence or absence of wheel slip may be determined by comparing a wheel's speed to a speed of a vehicle that includes the wheel. The vehicle's speed may be determined from wheels that are not slipping and wheel speeds may be determined from wheel speed sensors. A rotational speed difference between rotational speed of an output shaft of a transmission multiplied by the axle's gear ratio and rotational speed of a wheel may be indicative of loss of traction. For example, if a right wheel of an axle loses traction while the axle's differential is unlocked, speed of the right wheel may increase while speed of the left wheel may remain constant or decrease. This occurs because the axle differential equalizes the torque delivery between the right and left wheels and the torque that is transferred through the slipping wheel is reduced, thereby reducing torque that is delivered to the non-slipping wheel. Accordingly, speed of the non-slipping wheel may be reduced which may generate a speed difference between the rotational speed of the transmission output shaft multiplied by the gear ratio and the rotational speed of the non-slipping wheel. If method 400 judges that slip is present at the left front wheel slip or at the right front wheel, and that a rotational speed differential between a transmission output shaft rotational speed multiplied by the axle's gear ratio and a rotational speed of a wheel of the front axle is greater than a threshold speed, then the answer is yes and method 400 proceeds to 406. If method 400 does not judge that slip is present at the left front wheel slip or at the right front wheel, and does not judge that a rotational speed differential between a transmission output shaft rotational speed multiplied by the axle's gear ratio and a rotational speed of a wheel of the front axle is greater than a threshold speed, the answer is no and method 400 proceeds to 405.

At 405, method 400 unlocks the inter-axle differential. The inter-axle differential may be unlocked to improve braking performance and to reduce driveline losses. Method 400 proceeds to 408.

At 406, method 400 engages and locks the inter-axle differential lock so that inputs to the front axle differential and the rear axle differential of the tandem axle rotate at a same speed. Method 400 proceeds to 408.

At 408, method 400 judges if one or more axle differential locks are present. Method 400 may judge that axle differential locks are present based on values of vehicle configurations that are stored in controller memory. Alternatively, the tandem axle may provide input to the controller that indicates whether or not one or more axle differential locks are present in the tandem axle. If method 400 judges that one or more axle differential locks are present, the answer is yes and method 400 proceeds to 410. Otherwise, the answer is no and method 400 proceeds to 422.

At 422, method 400 judges if the inter-axle differential has been locked for longer than a predetermined threshold amount of time (e.g., 10 minutes). In one example, a timer is started at a time when the inter-axle differential is most recently locked. The timer value increases as long as the inter-axle differential is locked. If method 400 judges that the inter-axle differential has been locked for longer than the predetermined amount of time, the answer is yes and method 400 proceeds to 424. If method 400 judges that the inter-axle differential has not been locked for longer than the predetermined amount of time, the answer is no and method 400 returns to 402.

At 424, method 400 unlocks the inter-axle differential. Unlocking the differential allows output shafts of the inter-axle differential to rotate at different speeds, thereby avoiding dragging of wheels when a vehicle with the tandem axle is turning. Method 400 returns to 402.

At 410, method 400 judges whether or not left wheel slip or right wheel slip is present, and if an absolute value of a rotational speed differential between left and right wheels of an axle is greater than a threshold. This condition may be judged if one or more of the axle differentials are unlocked. Method 400 may proceed to 412 if the axle differential is already in a locked state. The condition may be expressed as:

$$\text{If } ((\text{slip}FL \text{ OR slip}FR) \text{ AND } (|\text{speed}FL - \text{speed}FR|) > \text{thres2}))$$

where thres2 is a second threshold speed, and where the other variables are as previously described. If method 400 judges that slip is present at the left wheel or right wheel, and if an absolute value of a rotational speed differential between left and right wheels of an axle is greater than the second threshold, the answer is yes and method 400 proceeds to 412. If method 400 judges that wheel slip is not present and the rotational speed differential is not greater than the second threshold, method 400 may proceed to 416.

Steps 410-420 may be performed for each axle. Specifically, steps 410-420 may be performed for the front axle of the tandem axle. Further, steps 410-20 may be performed for the rear axle of the tandem axle. As such, the differentials of the front and rear axles may be independently locked. Alternatively, if wheel slip and wheel speed differential are determined at one axle, the both the front and rear axle differentials may be locked.

At 416, method 400 unlocks the axle differential. In some examples, where both axles include differential locks, both axle differentials may be unlocked. Method 400 proceeds to 422.

At 412, method 400 judges if vehicle speed is less than a threshold speed (e.g., 25 miles/hour) and vehicle turning angle is less than a threshold turning angle (e.g., ±10 degrees) and road grade is greater than or equal to a threshold road grade (e.g., zero). This conditional requirement may be expressed as:

$$\text{If } ((V_s < \text{thres3}) \text{ AND } (\alpha < \text{thres4}) \text{ AND } (RG => \text{thres5}))$$

where Vs is vehicle speed, thres3 is a threshold vehicle speed (e.g., 25 mile/hour), α is the vehicle turning angle, thres4 is a threshold turning angle, RG is road grade, and thres5 is a threshold road grade. If method 400 judges that vehicle speed is less than a threshold speed and vehicle turning angle is less than a threshold turning angle and road grade is greater than or equal to a threshold road grade, the answer is yes and method 400 proceeds to 414. Otherwise, the answer is no and method 400 proceeds to 416.

At 414, method 400 locks the axle differential that is experiencing wheel slip and a left to right wheel speed differential. In some examples, method 400 may lock the differentials of both axles when conditions to lock a differential of one axle are met. Method 400 proceeds to 418.

At 418, method 400 judges if one of the axle differentials has been locked for longer than a predetermined threshold amount of time (e.g., 10 minutes). In one example, a timer is started at a time when the axle differential is most recently locked. The timer value increases as long as the axle differential is locked. If method 400 judges that the axle differential has been locked for longer than the predetermined amount of time, the answer is yes and method 400 proceeds to 420. If method 400 judges that the axle differential has not been locked for longer than the predetermined amount of time, the answer is no and method 400 proceeds to 422.

At 420, method 400 unlocks the axle differential. Unlocking the axle differential allows axle shafts to rotate at different speeds, thereby avoiding dragging of a wheel when a vehicle with the tandem axle is turning. In some examples, method 400 may unlock axle differentials of both the front and rear axles of the tandem axle. Method 400 proceeds to 422.

In this way, an inter-axle differential may be automatically controlled so that traction may be improved and so that the inter-axle may be unlocked to conserve energy. Further, axle differentials of a tandem axle may be selectively locked and unlocked to improve traction and conserve energy. Such a method may improve vehicle control and lessen a burden that is placed on the vehicle operator.

Thus, the method of FIGS. 4 and 5 provides for a method for operating a tandem axle, comprising: via a controller, locking an inter-axle differential to distribute torque to a first axle and a second axle in response to a brake pedal not being applied, an indication of slip of a wheel, and a rotational speed differential between a transmission output rotational speed multiplied by a gear ratio and a wheel rotational speed exceeding a threshold speed. The method includes where the controller is an axle controller that communicates with a vehicle controller. The method further comprises unlocking the inter-axle differential a predetermined amount of time after most recently locking the inter-axle differential. The method further comprises unlocking the inter-axle differential in response to the brake being applied. The method includes where the controller is a vehicle controller. The method includes where the speed differential is greater than five revolutions per minute. The method includes where the gear ratio is the gear ratio of the first axle.

The method of FIGS. 4 and 5 also provides for a method for operating a tandem axle, comprising: via a controller, locking an inter-axle differential to distribute torque to a first axle and a second axle in response to a brake pedal not being applied, an indication of slip of a wheel, and a rotational speed differential between a transmission output rotational speed multiplied by a gear ratio and a wheel rotational speed exceeding a threshold speed; and via the controller, locking a differential of the first axle in response to a rotational speed differential between a left wheel of the first axle and a right wheel of the first axle being greater than a first threshold, vehicle speed being less than a second threshold, and a turning angle being less than a third threshold. The method includes where the first axle is a front axle of a tandem axle. The method includes where the first axle is a rear axle of the tandem axle. The method further comprises unlocking the differential of the first axle in response to the turning angle being greater than the third threshold. The method further comprises unlocking the differential of the first axle in response to the vehicle speed being greater than the second threshold. The method further comprises unlocking the differential of the first axle in response to an amount of time the differential of the first axle is locked.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

Referring now to FIG. 6, a prophetic example operating sequence for a tandem axle is shown. The sequence of FIG. 6 may be provided via the system of FIGS. 1-3 in cooperation with the method of FIGS. 4 and 5.

The first plot from the top of FIG. 6 is a plot of front right wheel slip versus time. The vertical axis represents a wheel slip amount and the wheel slip amount increases in the direction of the vertical axis arrow. The horizontal axis represents time and time increases from the left side of the figure to the right side of the figure. Horizonal line 652 represents a threshold amount of slip. Slip is indicated when the slip amount exceeds threshold 652. Trace 600 represents the slip amount for the front right wheel of a tandem axle.

The second plot from the top of FIG. 6 is a plot of front left wheel slip versus time. The vertical axis represents a wheel slip amount and the wheel slip amount increases in the direction of the vertical axis arrow. The horizontal axis represents time and time increases from the left side of the figure to the right side of the figure. Horizontal line 654 represents a threshold amount of slip. Slip is indicated when the slip amount exceeds threshold 654. Trace 602 represents the slip amount for the front left wheel of a tandem axle.

The third plot from the top of FIG. 6 is a plot of rear right wheel slip versus time. The vertical axis represents a wheel slip amount and the wheel slip amount increases in the direction of the vertical axis arrow. The horizontal axis represents time and time increases from the left side of the figure to the right side of the figure. Horizontal line 656 represents a threshold amount of slip. Slip is indicated when the slip amount exceeds threshold 656. Trace 604 represents the slip amount for the rear right wheel of a tandem axle.

The fourth plot from the top of FIG. 6 is a plot of rear left wheel slip versus time. The vertical axis represents a wheel slip amount and the wheel slip amount increases in the direction of the vertical axis arrow. The horizontal axis represents time and time increases from the left side of the figure to the right side of the figure. Horizontal line 658 represents a threshold amount of slip. Slip is indicated when the slip amount exceeds threshold 658. Trace 606 represents the slip amount for the rear left wheel of a tandem axle.

The fifth plot from the top of FIG. 6 is a plot of inter-axle differential (IAD) locking state versus time. The vertical axis represents IAD locking state. The horizontal axis represents time and time increases from the left side of the figure to the right side of the figure. The IAD is unlocked when trace 608 is at a level near the horizontal axis (UL). The IAD is locked when trace 608 is at a level near the vertical axis arrow (L). Trace 608 represents the IAD operating state.

The sixth plot from the top of FIG. 6 is a plot of front differential locking state versus time. The vertical axis represents front differential locking state. The horizontal axis represents time and time increases from the left side of the figure to the right side of the figure. The front differential is unlocked when trace 610 is at a level near the horizontal axis (UL). The front differential is locked when trace 610 is at a level near the vertical axis arrow (L). Trace 610 represents the front differential operating state.

The seventh plot from the top of FIG. 6 is a plot of a speed differential between rotational speed of a transmission output shaft multiplied by a final drive ratio and wheel speed of an axle (e.g., the front axle) versus time. The vertical axis represents the speed differential between rotational speed of a transmission output shaft multiplied by a final drive ratio and wheel speed. The horizontal axis represents time and time increases from the left side of the figure to the right side of the figure. Horizontal line 660 represents a threshold speed differential between transmission output shaft multiplied by a final drive ratio and wheel speed of an axle. Trace 612 represents the speed differential between rotational speed of a transmission output shaft multiplied by a final drive ratio and wheel speed of an axle.

The eighth plot from the top of FIG. 6 is a plot of vehicle speed versus time. The vertical axis represents vehicle speed and vehicle speed increases in the direction of the vertical axis arrow. The horizontal axis represents time and time increases from the left side of the figure to the right side of the figure. Horizontal line 662 represents a threshold vehicle speed. Trace 614 represents the vehicle speed.

The ninth plot from the top of FIG. 6 is a plot of vehicle turning angle versus time. The vertical axis represents vehicle turning angle and the vehicle turning angle increases in the direction of the vertical axis arrow. The horizontal axis represents time and time increases from the left side of the figure to the right side of the figure. Horizontal line 664 represents a threshold vehicle turning angle. Trace 616 represents the vehicle turning angle.

The tenth from the top of FIG. 6 is a plot of road grade versus time. The vertical axis represents road grade and the road grade increases in the direction of the vertical axis arrow. The horizontal axis represents time and time increases from the left side of the figure to the right side of the figure. Horizontal line 666 represents a threshold road grade. Trace 618 represents the road grade of the road that the vehicle is traveling on.

At time t0, the IAD and the axle differential are unlocked. There is no wheel slip and the speed differential between the transmission output speed multiplied by the final drive gear ratio and wheel speed is zero. The vehicle speed is at a lower level. The vehicle turn angle is zero and the road grade is zero.

At time t1, slip of the right front wheel exceeds threshold 652 so slip of the right front wheel is indicated. The front left wheel, rear left wheel, and rear right wheel are not slipping. The speed differential between the transmission output speed multiplied by the final drive gear ratio and wheel speed exceeds threshold 660. The vehicle speed is increasing and the vehicle is not turning. The road grade remains zero.

At time t2, the IAD is locked and the front axle differential is also locked. In some examples, the rear axle differential may also be locked. The slip amount of the front right wheel begins decreasing as the IAD and axle differential are locked. The front left, rear left, and rear right wheels are not slipping. The speed differential between the transmission output speed multiplied by the final drive gear ratio and wheel speed begins to decrease. The vehicle turn angle is zero and the road grade is zero.

At time t3, the turning angle of the vehicle has exceeded threshold 664. Therefore, the front differential is unlocked. Unlocking the front differential allows the front wheels to follow the turn without dragging one of the front wheels. The IAD remains locked and slip is not indicated at any vehicle wheel. The speed differential between the transmission output shaft speed multiplied by the final drive ratio and wheel speed is zero. The vehicle speed continues to increase. The road grade is zero.

Between time t3 and time t4, the vehicle turning angle is reduced to zero and the front differential remains unlocked. The IAD remains locked and wheel speed is not indicated. The speed differential between the transmission output shaft speed multiplied by the final drive ratio and wheel speed is zero. The vehicle speed continues to increase and the road grade remains unchanged.

At time t4, slip of the right front wheel increases again to a level that exceeds threshold 652 so slip of the right front wheel is indicated. The front left wheel, rear left wheel, and rear right wheel are not slipping. The speed differential between the transmission output speed multiplied by the final drive gear ratio and wheel speed exceeds threshold 660 for a second time. The vehicle speed is increasing and the vehicle is not turning. The IAD remains locked and the road grade remains zero.

At time t5, the front axle differential is locked a second time. In some examples, the rear axle differential may also be locked. The slip amount of the front right wheel begins decreasing as the axle differential is locked. The front left, rear left, and rear right wheels are not slipping. The speed differential between the transmission output speed multiplied by the final drive gear ratio and wheel speed begins to decrease. The vehicle turn angle is zero and the road grade is zero.

At time t6, vehicle speed exceeds threshold 662. Therefore, the front differential is unlocked, which may reduce driveline losses. The IAD remains locked until a threshold amount of time expires since the IAD was most recently locked (not shown). Wheel slip is not indicated and the speed differential between the transmission output speed multiplied by the final drive gear ratio and wheel speed is zero. The vehicle turning angle is zero and the road grade is zero.

In these ways, an IAD and axle differential may be automatically locked and unlocked via a controller to improve vehicle traction and reduce driveline losses. The axle differentials may be locked and unlocked responsive to vehicle turning angle, vehicle speed, and road grade.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a tandem axle, comprising:
via a controller, locking an inter-axle differential to distribute torque to a first axle and a second axle in response to a brake pedal not being applied, an indication of slip of a wheel, and a rotational speed differential between a transmission output rotational speed multiplied by a gear ratio and a wheel rotational speed exceeding a threshold speed.

2. The method of claim 1, where the controller is an axle controller that communicates with a vehicle controller.

3. The method of claim 1, further comprising unlocking the inter-axle differential a predetermined amount of time after most recently locking the inter-axle differential.

4. The method of claim 1, further comprising unlocking the inter-axle differential in response to the brake being applied.

5. The method of claim 1, where the controller is a vehicle controller.

6. The method of claim 1, where the speed differential is greater than five revolutions per minute.

7. The method of claim 1, where the gear ratio is the gear ratio of the first axle.

8. A system for operating a tandem axle, comprising:
a first axle including a first differential;
a second axle including a second differential;
an inter-axle differential configured to deliver torque to the first axle and the second axle, the inter-axle differential including a differential locking mechanism; and
a controller including executable instructions that cause the controller to lock the inter-axle differential to distribute torque to the first axle and the second axle in response to a brake pedal not being applied, an indication of slip of a wheel, and a rotational speed differential between a transmission output rotational speed multiplied by a gear ratio and a wheel rotational speed exceeding a threshold speed.

9. The system of claim 8, further comprising additional instructions to lock the first differential in response to a rotational speed differential between a left wheel of the first axle and a right wheel of the first axle being greater than a first threshold, vehicle speed being less than a second threshold, and a turning angle being less than a third threshold.

10. The system of claim 9, further comprising additional instructions to unlock the first differential in response to the turning angle being greater than the third threshold.

11. The system of claim 9, further comprising additional instructions to unlock the first differential in response to the vehicle speed being greater than the second threshold.

12. The system of claim 9, further comprising additional instructions to unlock the first differential in response to an amount of time the first differential is locked.

13. The system of claim 8, further comprising additional instructions to unlock the inter-axle differential a predetermined amount of time after most recently locking the inter-axle differential.

14. The system of claim 8, further comprising additional instructions to unlock the inter-axle differential in response to the brake being applied.

15. A method for operating a tandem axle, comprising:
via a controller, locking an inter-axle differential to distribute torque to a first axle and a second axle in response to a brake pedal not being applied, an indication of slip of a wheel, and a rotational speed differential between a transmission output rotational speed multiplied by a gear ratio and a wheel rotational speed exceeding a threshold speed; and
via the controller, locking a differential of the first axle in response to a rotational speed differential between a left wheel of the first axle and a right wheel of the first axle being greater than a first threshold, vehicle speed being less than a second threshold, and a turning angle being less than a third threshold.

16. The method of claim 15, where the first axle is a front axle of a tandem axle.

17. The method of claim 15, where the first axle is a rear axle of the tandem axle.

18. The method of claim 15, further comprising unlocking the differential of the first axle in response to the turning angle being greater than the third threshold.

19. The method of claim 15, further comprising unlocking the differential of the first axle in response to the vehicle speed being greater than the second threshold.

20. The method of claim 15, further comprising unlocking the differential of the first axle in response to an amount of time the differential of the first axle is locked.

* * * * *